(12) United States Patent
Kubota et al.

(10) Patent No.: US 6,858,316 B2
(45) Date of Patent: Feb. 22, 2005

(54) OPTICAL DISK PRODUCING SHEET

(75) Inventors: Shin Kubota, Yokohama (JP); Mamoru Kobayashi, Yosikawa (JP); Kazuyoshi Gbe, Shiraoka-machi (JP)

(73) Assignee: LINTEC Corporation, Tokyo (JP)

( * ) Notice: Subject to any disclaimer, the term of this patent is extended or adjusted under 35 U.S.C. 154(b) by 166 days.

(21) Appl. No.: 10/265,268

(22) Filed: Oct. 7, 2002

(65) Prior Publication Data

US 2003/0068513 A1 Apr. 10, 2003

(30) Foreign Application Priority Data

Oct. 9, 2001 (JP) ........................................ 2001-311966

(51) Int. Cl.$^7$ ............................. B32B 27/30; G11B 7/26
(52) U.S. Cl. ...................... 428/500; 369/286; 369/288; 428/65.1; 428/483; 430/270.14; 430/287.1
(58) Field of Search ................................ 369/286, 288; 428/65.1, 483, 500, 522; 430/270.14, 287.1

(56) References Cited

U.S. PATENT DOCUMENTS 4,410,978 A * 10/1983 vanden Broek et al. . 369/275.1

FOREIGN PATENT DOCUMENTS

WO    WO 03/032305 A1    4/2003

* cited by examiner

Primary Examiner—D. S. Nakarani
(74) Attorney, Agent, or Firm—Posz & Bethards, PLC (57) ABSTRACT

A stamper reception layer 11 of an optical disk producing sheet 1 is composed of a polymeric material that has energy-curing properties and possesses a pre-curing storage elastic modulus of $10^3$ to $10^6$ Pa. The number of deposits on a stamper can thus be reduced with this optical disk producing sheet 1.

7 Claims, 4 Drawing Sheets

OPTICAL DISK PRODUCING SHEET

BACKGROUND OF THE INVENTION

1. Field of the Invention

The present invention relates to an optical disk producing sheet, and more particularly to an optical disks producing sheet on which concavoconvex pattern of the stamper is transferred and pits or grooves are formed.

2. Description of the Related Art

The following method has been disclosed as a method for producing optical disks (Japanese Patent No. 2956989).

(a) A dry photohardenable film is laminated to an optically transparent substrate having stable dimensions.

(b) A reflective layer is optionally formed on the exposure surface of the dry photohardenable film.

(c) The exposed surface of the photohardenable film is embossed with relief information tracks by the application under pressure of a stamper containing a relief image of an information track.

(d) Actinic rays are passed through the transparent substrate and the photohardenable film while these are kept in contact with the stamper, and the photohardenable film is cured.

(e) The stamper is detached from the embossed and hardend film.

(f) A light reflecting layer is formed on the embossed surface of the hardened film.

The following compounds may be used for the composition constituting the dry photohardenable film: diacrylate ester of a bisphenol A epoxy resin derived from bisphenol A and epichlorohydrin, trimethylol propane trimethacrylate, optical brightening agents, 2-mercaptobenzoxazole, 2,2'-bis-(o-chlorophenyl)-4,4'5,5'-tetraphenyl biimidazole, trimethylol propane, glycerol triacetate, methoxy hydroquinone, thermal inhibitors, diethylhydroxylamine, ethyl acrylate (57%)/methyl methacrylate (39%)/acrylic acid (4%) copolymer, ethyl acrylate, ethyl acrylate (17%)/methyl methacrylate (71%)/acrylic acid (12%) copolymer, polycaprolactone, and zinc acetyl acetonate (Japanese Patent No. 2956989, Example 1).

The dry photohardenable film is a mixture of a polymer component for shape preservation, a photopolymerizable component for curing, a low-molecular-weight component for improving the pressure deformation in the embossing process, and other additives. In a mixing example such as that described above, the low-molecular-weight component does not contribute at all to the curing reaction, and remains in the hardened film in a low-molecular-weight form even after the photocuring. In addition, since the photopolymerizable component has a comparatively low molecular weight, the unreacted photopolymerizable component remains in the dry photohardenable film in a low-molecular-weight form.

If a large amount of the low-molecular-weight component remains in the cured dry photohardenable film, the internal strength of the film is lowered and microscopic ruptures are produced in the boundary area with the stamper when the film and the stamper are detached from each other. The ruptured dry photohardenable film deposits on the stamper, and the stamper becomes contaminated.

When the dry photohardenable film component deposits on the stamper in this manner, not only does the number of times that the stamper has to be cleaned in order to transfer an accurate concavoconvex pattern increase, but the stamper life decreases and the producing cost of the optical disks increases.

SUMMARY OF THE INVENTION

With the foregoing in view, it is an object of the present invention to provide an optical disk producing sheet with which the number of deposits formed on the stamper can be reduced.

Aimed at attaining the stated object, the optical disk producing sheet that relates to the present invention comprises a stamper-receiving layer that contains an energy rays-curable polymeric material as a principal component thereof, and possesses a pre-curing storage elastic modulus of $10^3$ to $10^6$ Pa (1).

In accordance with invention (1), the stamper-receiving layer comprises an energy rays-curable polymeric material and a large amount of a low-molecular-weight component does not remain in the stamper-receiving layer after curing, whereby the stamper-receiving layer has increased internal strength, microscopic ruptures are less likely to be produced in the stamper-receiving layer because of the stress at the time of separation from the stamper, and the stamper-receiving layer is prevented from partially depositing on the stamper.

In addition, the pre-curing storage elastic modulus of the stamper-receiving layer is kept at $10^3$ to $10^6$ Pa in the manner described in connection with invention (1), making it possible to accurately transfer the concavoconvex pattern from the stamper to the stamper-receiving layer by merely pressing the stamper against the stamper-receiving layer.

In invention (1), it is preferable that the post-curing storage elastic modulus of the stamper-receiving layer be $10^7$ Pa or greater (2). Keeping the post-curing storage elastic modulus of the stamper-receiving layer at this level allows the pits and grooves transferred to the stamper-receiving layer to be firmly fixed by the curing, and the pits and grooves to be prevented from being ruptured or deformed when the stamper is detached from the stamper-receiving layer.

In inventions (1 and 2), it is preferable that the polymeric material be an acrylic ester copolymer having energy rays-curable groups in the side chains thereof (3) and, in particular, that the energy rays-curable groups be unsaturated groups and that the weight-average molecular weight of the acrylic ester copolymer be 100,000 or greater (4).

A polymeric material such as that described above can comprise the stamper-receiving layer by itself, the concavoconvex pattern of the stamper can be accurately transferred with a stamper-receiving layer comprising the polymeric material, and virtually no deposits form on the stamper even when the material is peeled from the stamper after curing.

In invention (1–4), the stamper-receiving layer may further contain a photopolymerization initiator (5). When ultraviolet rays are employed as the energy rays, it is possible to reduce the polymer curing time as well as the amount of light ray irradiation by further adding a photopolymerization initiator in this manner to the stamper-receiving layer.

In inventions (1–5), a release sheet may laminated to one or both surfaces of the stamper-receiving layer (6). In addition, in inventions (1–6), a sheet constituting a protective layer may be laminated to one surface of the stamper-receiving layer (7).

DESCRIPTION OF THE PREFERRED EMBODIMENTS

Embodiments of the present invention will now be described.

First Embodiment

Figure 1:
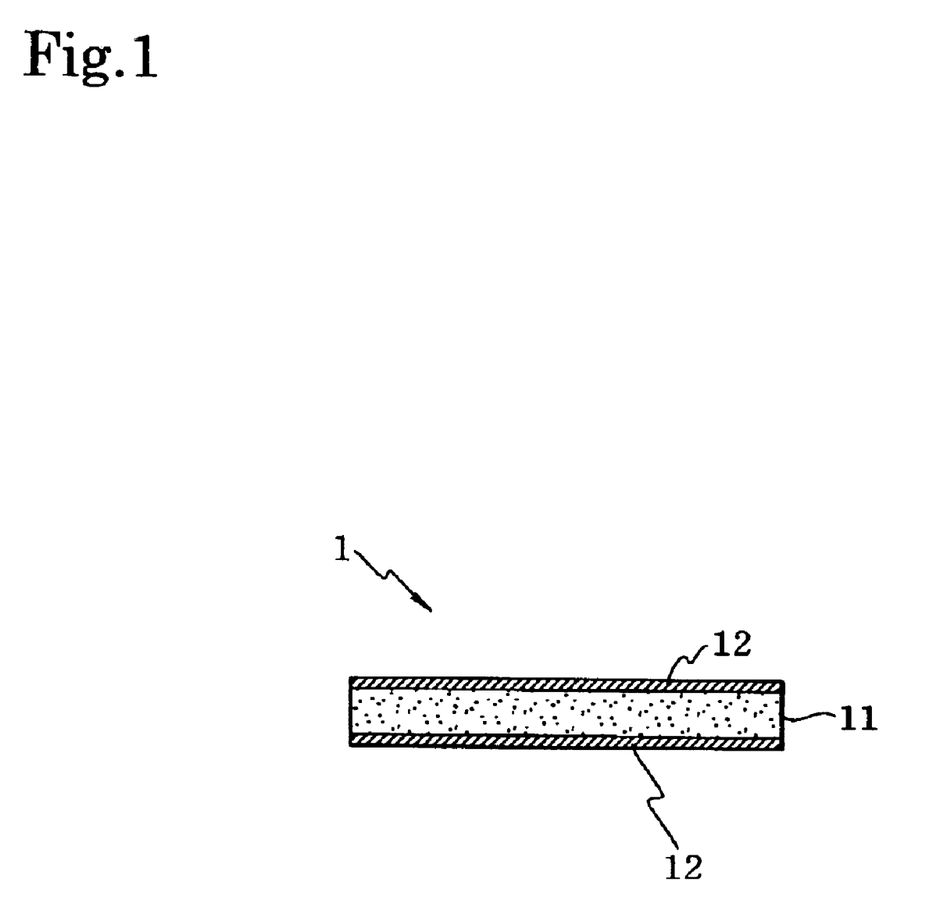
FIG. 1 is a cross-sectional view of an optical disk producing sheet related to the first embodiment of the present invention.

The optical disk producing sheet 1 pertaining to this embodiment comprises a stamper-receiving layer 11 and release sheets 12 laminated to both surfaces of the stamper-receiving layer 11, as shown in FIG. 1. The release sheets 12 are peeled off when the optical disk producing sheet 1 is used.

The stamper-receiving layer 11 is a layer on which concavoconvex pattern formed on the stamper is transferred and pits or grooves are formed. The stamper-receiving layer 11 comprises an energy rays-curable polymeric material. The pre-curing storage elastic modulus of the stamper-receiving layer 11 is $10^3$ to $10^6$ Pa, and preferably $10^4$ to $5 \times 10^5$ Pa.

As used herein, the measurement temperature for the "pre-curing storage elastic modulus" is the same temperature as that of the working environment in which the stamper and the optical disk producing sheet 1 are superimposed (pressed together). In other words, when the stamper and the optical disk producing sheet 1 are superimposed at room temperature, the storage elastic modulus is measured at room temperature, and when the stamper and the optical disk producing sheet 1 are superimposed while heated, the storage elastic modulus is measured at a temperature that is the same as the heating temperature.

When the pre-curing storage elastic modulus of the stamper-receiving layer 11 is in a range such as that described above, the concavoconvex pattern formed on the stamper is accurately transferred to the stamper-receiving layer 11 by merely pressing the stamper against the stamper-receiving layer 11, and it is extremely easy to produce an optical disk.

In addition, it is preferable that the post-curing storage elastic modulus of the stamper-receiving layer 11 be $10^7$ Pa or greater, and particularly $10^8$ to $10^{10}$ Pa. As used herein, the measurement temperature for the "post-curing storage elastic modulus" is the same temperature as the optical disk storage temperature, that is, room temperature.

When the post-curing storage elastic modulus of the stamper-receiving layer 11 is in a range such as that described above, the pits and grooves transferred to the stamper-receiving layer 11 are securely fixed by the curing, and there is no danger of rupturing or distortion of the pits and grooves when the stamper and the stamper-receiving layer 11 are detached from each other.

It is preferable that the polymeric material constituting the stamper-receiving layer 11 be an acrylic ester copolymer having energy rays-curable groups in the side chains thereof. It is also preferable that the acrylic ester copolymer be an energy rays-curable copolymer (A) having a molecular weight of 100,000 or greater and containing energy rays-curable groups in the side chains thereof, obtained by reacting an acrylic copolymer (a1) having monomer units containing functional groups, and a compound containing unsaturated groups (a2) whose substituents are bonded to the functional groups.

The acrylic copolymer (a1) comprises structural units derived from a monomer containing functional groups, and structural units derived from a (meth)acrylic ester monomer or a derivative thereof.

The monomer containing functional groups in the acrylic copolymer (a1) is a monomer that has polymerizable double bonds and functional groups such as hydroxyl, carboxyl, amino, substituted amino, and epoxy groups in the molecules thereof. An unsaturated compound containing hydroxyl groups, or an unsaturated compound containing carboxyl groups should preferably be used.

Additional specific examples of monomers containing functional groups include 2-hydroxyethyl acrylate, 2-hydroxyethyl methacrylate, 2-hydroxypropyl acrylate, 2-hydroxypropyl methacrylate, and other acrylates containing hydroxyl groups, as well as acrylic acid, methacrylic acid, itaconic acid, and other compounds containing carboxyl groups. These may be used individually or as combinations of two or more components.

Cycloalkyl (meth)acrylate, benzyl (meth)acylate, and alkyl (meth)acrylate in which the carbon number of the alkyl group is 1 to 18 may be used as the (meth)acrylic ester monomer constituting the (meth)acrylic copolymer (a1). Among these, alkyl (meth)acrylate in which the carbon number of the acrylic group is 1 to 18 such as methyl (meth)acrylate, ethyl (meth)acrylate, propyl (meth)acrylate, butyl (meth)acrylate, or 2-ethylhexyl (meth)acrylate or the like are ideally used.

The acrylic copolymer (a1) contains structural units derived from the monomer containing the functional groups in a ratio that is commonly 3–100 wt %, preferably 5–40 wt %, and ideally 10–30 wt %, and contains structural units derived from the (meth)acrylic ester monomer or derivatives thereof in a ratio that is commonly 0–97 wt %, preferably 60–95 wt %, and ideally 70–90 wt %.

The acrylic copolymer (a1) may be obtained by copolymerizing a monomer containing functional groups with a (meth)acrylic ester monomer or a derivative thereof by a common technique. Vinyl formate, vinyl acetate, styrene, and the like may be copolymerized in addition to these monomers in a low ratio (for example, 10 wt % or less, and preferably 5 wt % or less).

The energy rays-curable copolymer (A) may be obtained by reacting the acrylic copolymer (a1) with monomer units containing functional groups and the compound containing unsaturated groups (a2) whose substituents are bonded to the functional groups.

The substituents of the compound containing unsaturated groups (a2) can be appropriately selected in accordance with the type of functional group in the monomer units containing functional groups in the acrylic copolymer (a1). For example, isocyanate or epoxy groups are preferred as the substituents when the functional groups are hydroxyl, amino, or substituted amino groups. Aziridinyl, epoxy, or oxazoline group are preferred as the substituents when the functional groups are carboxyl groups; and amino, carboxyl, or aziridinyl groups are preferred when the functional groups are epoxy groups. One such substituent is contained per molecule of the compound containing unsaturated groups (a2).

The compound containing unsaturated groups (a2) has 1 to 5, and preferably 1 to 2, energy rays-curable carbon-carbon double bonds per molecule. Specific examples of compounds containing unsaturated groups (a2) include methacryloyl oxyethyl isocyanate; meta-isopropenyl-α,α-dimethylbenzyl isocyanate; methacryloyl isocyanate; allyl isocyanate; acryloyl monoisocyanate compounds obtained by the reaction of a diisocyanate or polyisocyanate compound with hydroxyethyl (meth)acrylate; acryloyl monoisocyanate compounds obtained by the reaction of a diisocyanate or polyisocyanate compound, a polyol compound, and hydroxyethyl (meth)acrylate; glycidyl (meth)acrylate; (meth)acrylic acid; 2-(1-aziridinyl)ethyl (meth)acrylate; 2-vinyl-2-oxazoline; and 2-isopropenyl-2-oxazoline.

The compound containing unsaturated groups (a2) is used in a ratio that is commonly 20–100 equivalents, preferably 40–95 equivalents, and ideally 60–90 equivalents, per 100 equivalents of the monomer containing functional groups in the acrylic copolymer (a1).

The reaction between the acrylic copolymer (a1) and the compound containing unsaturated groups (a2) is usually performed for about 12–48 hours under an inert gas atmosphere at normal pressure, either at room temperature or heated to 40 to 70° C., in an organic solvent such as ethyl acetate. Catalysts, polymerization inhibitors, or the like may be appropriately used at the time of the reaction. For example, a catalyst based on dibutyltin laurate or another organotin compound should preferably be used when the reaction is performed between an acrylic copolymer whose functional groups are hydroxyl groups, and a compound containing unsaturated groups whose substituents are isocyanate groups. It is also possible to appropriately select reaction temperature, pressure, solvent, time, presence or absence of a catalyst, and type of catalyst in accordance with the combination of functional groups and substituents. The functional groups present in the side chains of the acrylic copolymer (a1) and the substituents in the compound containing unsaturated groups (a2) can thus be reacted, and the unsaturated groups can be introduced into the side chains of the acrylic copolymer (a1), yielding an energy rays-curable copolymer (A). The rate of reaction between the functional groups and substituents during the reaction is commonly 70% or greater, and preferably 80% or greater. Unreacted functional groups may remain in the energy rays-curable copolymer (A).

The weight-average molecular weight of the energy rays-curable copolymer (A) should be 100,000 or greater, preferably 150,000–1,500,000, and ideally 200,000–1,000,000.

The polymerization/curing time and irradiation dose can be reduced by the addition of a photopolymerization initiator (B) to the energy rays-curable copolymer (A) when ultraviolet rays are employed as the energy rays.

Specific examples of photopolymerization initiator (B) include benzophenone, acetophenone, benzoin, benzoin methyl ether, benzoin ethyl ether, benzoin isopropyl ether, benzoin isobutyl ether, benzoin benzoate, benzoin benzoate methyl, benzoin dimethyl ketal, 2,4-diethyl thioxanthone, 1-hydroxycyclohexyl phenyl ketone, benzyl diphenyl sulfide, tetramethylthiuram monosulfide, azobisisobutyronitrile, benzyl, dibenzyl, diacetyl, β-chloroanthraquinone, (2,4,6-trimethyl benzyl diphenyl) phosphine oxide, and 2-benzothiazole-N,N-diethyl dithiocarbamate. The photopolymerization initiator (B) should preferably be used in an amount of 0.1–10 parts by weight, and particularly 0.5–5 parts by weight, per 100 parts by weight of the energy rays-curable copolymer (A).

Other components may be appropriately mixed with the energy rays-curable copolymer (A) and the photopolymerization initiator (B) in the stamper-receiving layer 11. Examples of such other components include polymer components or oligomer components with no energy-curing properties (C), energy rays-curable multifunctional monomer or oligomer components (D), crosslinking agents (E), and other additives (F).

Examples of polymer components or oligomer components with no energy-curing properties (C) include polyacrylic ester, polyester, polyurethane, polycarbonate, and polyolefin, preferably polymers or oligomers having a weight-average molecular weight of 3,000 to 2.5 million.

Examples of energy rays-curable multifunctional monomer or oligomer components (D) include trimethylol propane tri(meth)acrylate, pentaerythritol tri(meth)acrylate, pentaerythritol tetra(meth)acrylate, dipentaerythritol hexa(meth)acrylate, 1,4-butanediol di(meth)acrylate, 1,6-hexanediol di(meth)acrylate, polyethylene glycol di(meth) acrylate, polyester oligo(meth)acrylate, and polyurethane oligo(meth)acrylate.

A multifunctional compound that can react with the functional groups possessed by the energy rays-curable copolymer (A) or the like can be used as the crosslinking agent (E). Examples of such multifunctional compounds include isocyanate compounds, epoxy compounds, amine compounds, melamine compounds, aziridine compounds, hydrazine compounds, aldehyde compounds, oxazoline compounds, metal alkoxide compounds, metal chelate compounds, metal salts, ammonium salts, and reactive phenol resins.

Examples of other additives (F) include UV absorbers, plasticizers, fillers, antioxidants, tackifiers, colorants, dyes, and coupling agents.

Admixing such other components into the stamper-receiving layer 11 sometimes makes it easier to transfer an concavoconvex pattern prior to curing and improves post-curing strength, adhesion and release in relation to other layers, storage stability, and the like.

The pre-curing storage elastic modulus of the stamper-receiving layer 11 must be $10^3$–$10^6$ Pa when such other components are admixed into the stamper-receiving layer 11, and it should preferably be designed to reduce the number of deposits formed by the stamper-receiving layer 11 on the stamper. Specifically, the number of deposits formed by the stamper-receiving layer 11 on a planished nickel plate should preferably no more than 200, and particularly no more than 100. The other components should preferably be admixed in a combined amount of 0–50 parts by weight, and particularly 0–20 parts by weight, per 100 parts by weight of the energy rays-curable copolymer (A).

The thickness of the stamper-receiving layer 11 is determined in accordance with the depth of the pits or grooves to be formed, and is commonly about 5–100 $\mu$m, and preferably about 5–50 $\mu$m.

Since the optical disk producing sheet 1 pertaining to the present embodiment is such that the stamper-receiving layer 11 tend to be readily deformed by pressure, release sheets 12 are laminated on both sides of the stamper-receiving layer 11 to prevent such deformation from occurring. Conventionally known materials can be used for the release sheets 12. It is possible, for example, to use polyethylene terephthalate films, polypropylene films, or other resin films treated with silicone release agents or the like to endow these films with release properties.

The surface roughness (Ra) of the release sheets 12 on the side treated to achieve release properties (on the side facing the stamper-receiving layer 11) should preferably be kept at 0.1 $\mu$m or less in order to endow the stamper-receiving layer 11 with smoothness. The thickness of the release sheets 12 is commonly about 10–200 $\mu$m, and preferably about 20–100 $\mu$m.

The optical disk producing sheet 1 pertaining to the present embodiment can be obtained by preparing a coating agent that contains the materials constituting a stamper-receiving layer 11 and an optional solvent if necessary; applying the coating agent to a release sheet 12 by a kiss roll coater, reverse roll coater, knife coater, roll knife coater, die coater, or other coating apparatus, and drying the coating agent to form a stamper-receiving layer 11; and laminating another release sheet 12 on the surface of the stamper-receiving layer 11.

Following is a description of a method for producing an optical disk by employing the above-described optical disk producing sheet 1.

Figure 2:
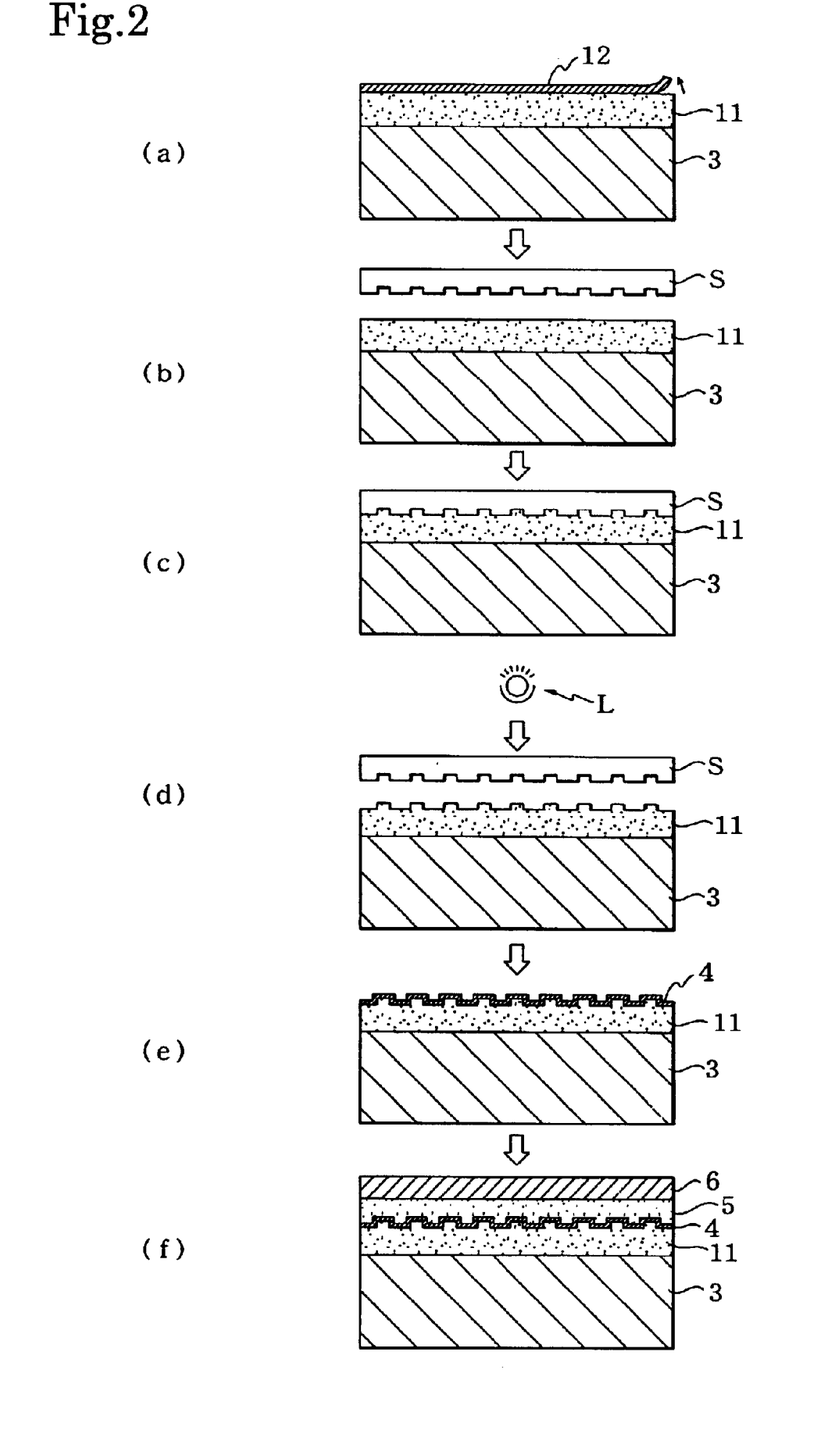
FIG. 2 is a cross-sectional view depicting an example of an optical disk producing method that uses an optical disk producing sheet related to the same embodiment.

First, the release sheet 12 on one side of the optical disk producing sheet 1 is peeled off and removed, the exposed stamper-receiving layer 11 is laminated to an optical disk substrate 3 composed of polycarbonate or the like, the components are bonded by pressure, the other release sheet 12 laminated on the stamper-receiving layer 11 is peeled off and removed, and the stamper-receiving layer 11 is exposed, as shown in FIG. 2(a).

A stamper S is subsequently pressed against the exposed surface of the stamper-receiving layer 11, and the concavoconvex pattern of the stamper S is transferred to the stamper-receiving layer 11, as shown in FIGS. 2(b) and 2(c). The stamper S can be applied at room temperature if the storage elastic modulus of the stamper-receiving layer 11 at room temperature is $10^3$–$10^6$ Pa.

The stamper S is commonly composed of a nickel alloy or other metal material. The stamper S shown in FIGS. 2(b) to 2(d) is shaped as a plate, but this is not the only option, and a roll shape is also acceptable.

The stamper-receiving layer 11 is irradiated with energy rays from the side facing the optical disk substrate 3 by employing an energy ray irradiation apparatus (a UV lamp L is employed in the example shown in FIG. 2(c)) while the stamper S is kept in close contact with the stamper-receiving layer 11, as shown in FIG. 2(c) The energy rays-curable material constituting the stamper-receiving layer 11 is thereby cured and the storage elastic modulus thereof is increased.

Ultraviolet rays, electron rays, or the like are commonly used as such energy rays. The irradiation dose of the energy rays varies with the type of energy rays and may, for example, be about 100–500 mJ/cm$^2$ (in terms of light quantity) for ultraviolet rays, and about 10–1000 krad for electron rays.

The stamper S is subsequently detached from the stamper-receiving layer 11, as shown in FIG. 2(d). It is less likely in this case that a low-molecular-weight component will be left behind following curing because the stamper-receiving layer 11 contains an energy rays-curable polymeric material as the principal component thereof. Specifically, any low-molecular-weight component present in the stamper-receiving layer 11 before cure will readily copolymerize with the energy rays-curable polymeric material (principal component), causing the remaining amount to decrease following irradiation. The absence of any remaining low-molecular-weight component in the cured stamper-receiving layer 11 increases the inner strength of the stamper-receiving layer 11 and makes it less likely that microcracks will be formed in the stamper-receiving layer 11 by the stress of separation from the stamper S. It is therefore possible to prevent part of the stamper-receiving layer 11 from depositing on the stamper S after separation from the stamper S, with the result that the stamper S needs to be washed less frequently, the service life of the stamper S can be increased, and optical disks can therefore be manufactured at a low cost.

Once the concavoconvex pattern of the stamper S has been transferred and fixed to the stamper-receiving layer 11 to form pits or grooves in the above-described manner, a reflective layer 4 is formed on the surface of the stamper-receiving layer 11 by sputtering or another means, as shown in FIG. 2(e). The reflective layer 4 may also be a multilayer further containing a phase-change recording layer or other recording layer.

A protective sheet 6 is laminated to the reflective layer 4 with the aid of an adhesive 5 to produce an optical disk, as shown in FIG. 2(f). The protective sheet 6 may, for example, be identical to the protective sheet used for the optical disk producing sheet pertaining to the second embodiment described below.

Second Embodiment

Following is a description of an optical disk producing sheet pertaining to a second embodiment.

Figure 3:
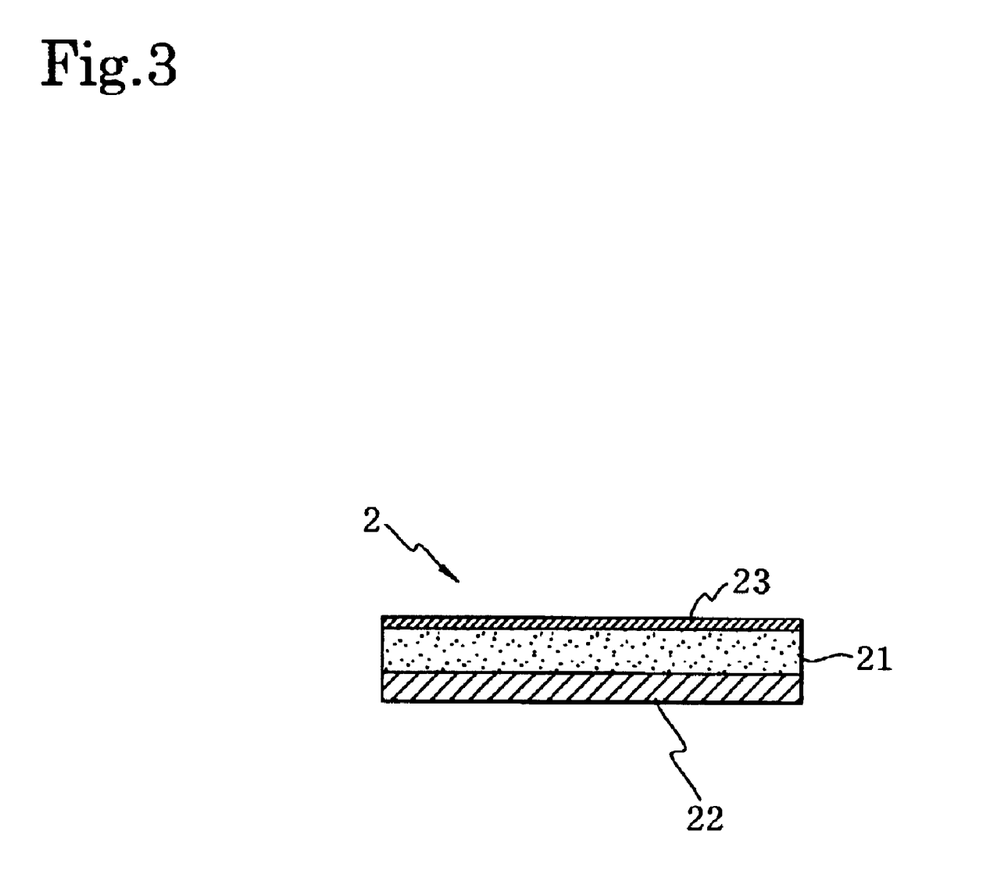
FIG. 3 is a cross-sectional view of an optical disk producing sheet related to the second embodiment of the present invention.

The optical disk producing sheet 2 pertaining to the second embodiment comprises a stamper-receiving layer 21, a protective sheet 22 laminated to one side (bottom side in FIG. 3) of the stamper-receiving layer 21, and a release sheet 23 laminated to the other side (upper side in FIG. 3) of the stamper-receiving layer 21, as shown in FIG. 3. The release sheet 23 is peeled off when the optical disk producing sheet 1 is used.

The stamper-receiving layer 21 is composed of the same material and is fashioned to the same thickness as the stamper-receiving layer 11 for the optical disk producing sheet 1 pertaining to the first embodiment described above. The release sheet 23 is composed of the same material and is fashioned to the same surface roughness (Ra) as the release sheet 12 for the optical disk producing sheet 1 pertaining to the first embodiment described above.

The protective sheet 22 of the present embodiment constitutes part of an optical disk, such as the light-receiving surface of the optical disk or the labeling surface thereof. Any material with sufficient light transmittance in the wavelength band of information-reading light may be used as the material for the protective sheet 22 when the protective sheet 22 constitutes the light-receiving surface, and a material provided with an adherend surface in order to make it easier to fix the ink for label printing should preferably be used when the protective sheet 22 constitutes the label surface. In either case, the material of the protective sheet 22 should preferably have optimum stiffness or flexibility in order to facilitate the manufacture of optical disks, and remain stable against temperature in order to improve the storage properties of the optical disks. Examples of such materials include polycarbonate, polymethyl methacrylate, polystyrene, and other resins.

The coefficient of linear expansion of the protective sheet 22 should preferably be substantially equal to the coefficient of linear expansion of the optical disk substrate 3 in order to prevent the optical disk from warping at high temperatures. For example, the protective sheet 22 should preferably be composed of polycarbonate resin when the optical disk substrate 3 is composed of polycarbonate resin.

The thickness of the protective sheet 22, while determined in accordance with the type of optical disk or the thickness of the other component of the optical disk, is commonly about 25–300 µm, and preferably about 50–200 µm.

The optical disk producing sheet 2 pertaining to the present embodiment can be obtained by preparing a coating agent that contains the materials constituting a stamper-receiving layer 21 and an optional solvent if necessary; applying the coating agent to a protective sheet 22 by a kiss roll coater, reverse roll coater, knife coater, roll knife coater, die coater, or other coating apparatus, and drying the coating agent to form a stamper-receiving layer 21; and laminating a release sheet 23 on the surface of the stamper-receiving layer 21; or applying the coating agent to a release sheet 23, and drying the coating agent to form a stamper-receiving layer 21; and laminating a protective sheet 22 on the surface of the stamper-receiving layer 21.

Following is a description of a method for producing an optical disk by employing the above-described optical disk producing sheet 2.

Figure 4:
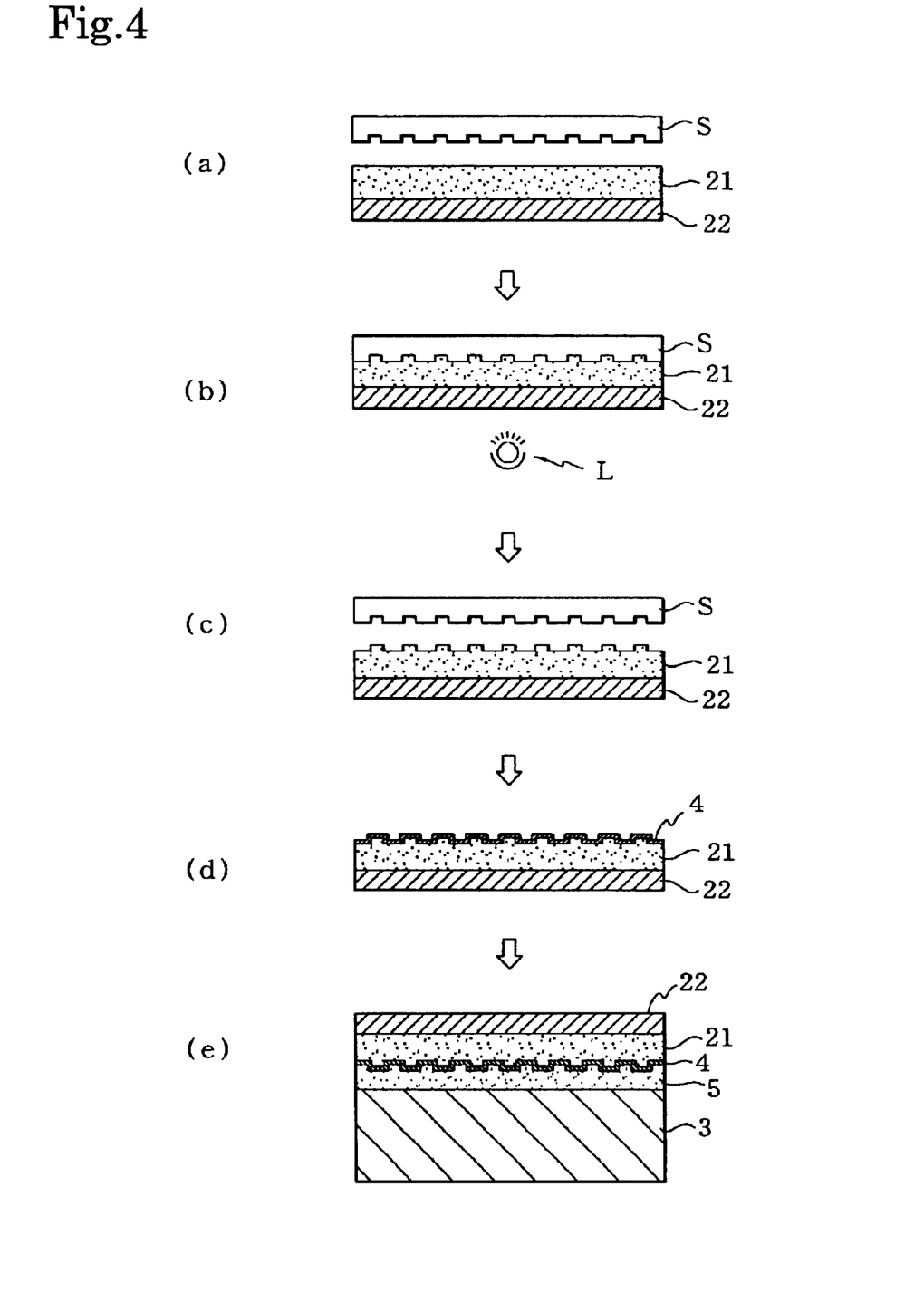
FIG. 4 is a cross-sectional view depicting an example of an optical disk producing method that uses an optical disk producing sheet related to the same embodiment.

First, the release sheet 23 of the optical disk producing sheet 2 is peeled off and removed and the stamper-receiving layer 21 is exposed, as shown in FIG. 4(a).

A stamper S is subsequently pressed against the exposed surface of the stamper-receiving layer 21, and the concavoconvex pattern of the stamper S is transferred to the stamper-receiving layer 21, as shown in FIGS. 4(a) and 4(b).

The stamper-receiving layer 21 is irradiated with energy rays from the side facing the protective sheet 22 by employing an energy ray irradiation apparatus (a UV lamp L is employed in the example shown in FIG. 4(b)) while the stamper S is kept in close contact with the stamper-receiving layer 21, as shown in FIG. 4(b). The material constituting the stamper-receiving layer 21 is thereby cured and the storage elastic modulus thereof is increased.

The stamper S is subsequently detached from the stamper-receiving layer 21, as shown in FIG. 4(c). Once the concavoconvex pattern of the stamper S has been transferred and fixed to the stamper-receiving layer 21 to form pits or grooves in the above-described manner, a reflective layer 4 is formed on the surface of the stamper-receiving layer 21 by sputtering or another means, as shown in FIG. 4(d). The reflective layer 4 may also be a multilayer further containing a phase-change recording layer or other recording layer.

An optical disk substrate 3 is laminated to the reflective layer 4 with the aid of an adhesive 5 to produce an optical disk, as shown in FIG. 4(e).

The above embodiments were described in order to make it easier to understand the present invention and are not intended to limit the present invention. Consequently, the elements disclosed in the above embodiments also include all design modifications or equivalents pertaining to the technological scope of the present invention.

For example, it is possible to dispense with one or both release sheets 12 for the optical disk producing sheet 1, or with the release sheet 23 for the optical disk producing sheet 2.

EXAMPLES

The present invention will now be described in further detail through examples, but the scope of the present invention is not limited to these examples.

Example 1

Manufacture of Coating Agent A for Stamper-receiving Layer

Butyl acrylate (62 parts by weight), methyl methacrylate (10 parts by weight), and 2-hydroxyethyl acrylate (28 parts by weight) were reacted in ethyl acetate, yielding an ethyl acetate solution (solids concentration: 40 wt %) of an acrylic copolymer having hydroxyl groups for functional groups. Ethyl acetate (100 parts by weight), methacryloyl oxyethyl isocyanate (30 parts by weight, or 80.5 equivalents per 100 equivalents of the 2-hydroxyethyl acrylate in the acrylic copolymer) serving as a compound containing unsaturated groups and having isocyanate groups for substituents, and dibutyltin dilaurate (0.12 part by weight) serving as a catalyst were added to 250 parts by weight of the ethyl acetate solution of the acrylic copolymer, and a reaction was conducted for 24 hours at room temperature under a nitrogen atmosphere, yielding an energy rays-curable copolymer. The weight-average molecular weight (Mw) of the energy rays-curable copolymer was 600,000.

1-hydroxycyclohexyl phenyl ketone (name of product: Irgacure 184; manufactured by Ciba Specialty Chemicals K.K.) serving as a photopolymerization initiator was dissolved in an amount of 3.7 parts by weight in 100 parts by weight of the solid fraction of the resulting energy rays-curable copolymer, and the solids concentration thereof was adjusted to 35 wt %, yielding coating agent A for a stamper-receiving layer.

The following two types of release sheets were prepared: a heavy-release sheet (surface roughness Ra of release-treated surface: 0.016 μm) obtained by the release treatment of one side of a polyethylene terephthalate (PET) film (thickness: 38 μm) with a heavy-release silicone resin, and a light-release sheet (surface roughness Ra of release-treated surface: 0.023 μm) obtained by the release treatment of one side of a PET film (thickness: 38 μm) with a light-release silicone resin.

The coating agent A was applied to the release-treated surface of the heavy-release sheet with a knife coater, and the coating agent A was dried for 1 minute at 90° C. to form a stamper-receiving layer with a thickness of 10 μm. The light-release sheet was laminated to the surface of the stamper-receiving layer, and the product was used as an optical disk producing sheet.

Example 2

Manufacture of Coating Agent B for Stamper-receiving Layer

2-Ethyl hexyl acrylate (80 parts by weight) and 2-hydroxyethyl acrylate (20 parts by weight) were reacted in ethyl acetate, yielding an ethyl acetate solution (solids concentration: 40 wt %) of an acrylic copolymer having hydroxyl groups for functional groups. Ethyl acetate (100 parts by weight), methacryloyl oxyethyl isocyanate (21 parts by weight, or 78.5 equivalents per 100 equivalents of the 2-hydroxyethyl acrylate in the acrylic copolymer) serving as a compound containing unsaturated groups and having isocyanate groups for substituents, and dibutyltin dilaurate (0.025 part by weight) serving as a catalyst were added to 250 parts by weight of the ethyl acetate solution of the acrylic copolymer, and a reaction was conducted for 48 hours at room temperature under a nitrogen atmosphere, yielding an energy rays-curable copolymer. The weight-average molecular weight (Mw) of the energy rays-curable copolymer was 790,000.

1-hydroxycyclohexyl phenyl ketone (name of product: Irgacure 184; manufactured by Ciba Specialty Chemicals K.K.) serving as a photopolymerization initiator was dissolved in an amount of 3.8 parts by weight in 100 parts by weight of the solid fraction of the resulting energy rays-curable copolymer, and the solids concentration thereof was adjusted to 33 wt %, yielding coating agent B for a stamper-receiving layer.

The coating agent B was applied with a roll knife coater to the release-treated surface of the same heavy-release sheet as the one used in Example 1, and the coating agent B was dried for 1 minute at 100° C. to form a stamper-receiving layer with a thickness of 30 μm. The same light-release sheet as the one used in Example 1 was laminated to the surface of the stamper-receiving layer, and the product was used as an optical disk producing sheet.

Example 3

The coating agent A prepared in Example 1 was applied with a knife coater to the release-treated surface of the same light-release sheet as the one used in Example 1, and the coating agent A was dried for 1 minute at 90° C. to form a stamper-receiving layer with a thickness of 10 μm. A light-transmitting polycarbonate (PC) film (name of product: PureAce C110-100; manufactured by Teijin Limited; thickness: 100 μm) was laminated as a protective layer to the surface of the stamper-receiving layer to obtain an optical disk producing sheet with a protective layer.

Example 4

The coating agent B prepared in Example 2 was applied with a roll knife coater to the release-treated surface of the same light-release sheet as the one used in Example 1, and the coating agent B was dried for 1 minute at 100° C. to form a stamper-receiving layer with a thickness of 30 μm. The same light-transmitting PC film as the one used in Example 3 was laminated as a protective layer to the surface of the stamper-receiving layer to obtain an optical disk producing sheet with a protective layer.

Comparison 1

A dry film photopolymer element composition was prepared in accordance with Example 1 of Japanese Patent No. 2956989. The resulting dry film photopolymer element composition was used to fabricate an optical disk producing sheet in the same manner as in Example 1.

Comparison 2

The dry film photopolymer element composition prepared in Comparison 1 was used to fabricate an optical disk producing sheet in the same manner as in Example 3.

Experiment 1

The pre-curing storage elastic modulus of stamper-receiving layers for the optical disk producing sheets manufactured in Examples 1 and 2 and in Comparison 1 were measured at 1 Hz and 25° C. using a viscoelasticity measuring instrument (instrument name: Dynamic Analyzer RDA II; manufactured by Rheometrics Inc.). The results were $1.4 \times 10^4$ Pa for the stamper-receiving layer in Example 1, $6.1 \times 10^4$ Pa for the stamper-receiving layer in Example 2, and $2.0 \times 10^5$ Pa for the stamper-receiving layer in Comparison 1.

The stamper-receiving layers were irradiated with ultraviolet rays (instrument name: Adwill RAD-2000m/8; manufactured by Lintec Corporation was used; irradiation conditions: luminance of 310 mW/cm$^2$, light quantity of 300 mJ/cm$^2$), and the storage elastic modulus of the cured stamper-receiving layers were measured at 3.5 Hz and 25° C. using a viscoelasticity measuring instrument (instrument name: Rheovibron DDV-II-EP; manufactured by Orientec Co., Ltd). The results were $6.0 \times 10^8$ Pa for the stamper-receiving layer in Example 1, $3.2 \times 10^8$ Pa for the stamper-receiving layer in Example 2, and $1.4 \times 10^{10}$ Pa for the stamper-receiving layer in Comparison 1.

Experiment 2

Light-release sheets were peeled off from the optical disk producing sheets manufactured in Examples 3 and 4 and in Comparison 2, and planished nickel disks (diameter: 120 mm) were compression-bonded to the exposed surfaces of the stamper-receiving layers at a pressure of 29 N. The stamper-receiving layers were cured by being irradiated from the side facing the protective layers (instrument name: Adwill RAD-2000m/8; manufactured by Lintec Corporation was used; irradiation conditions: luminance of 310 mW/cm$^2$, light quantity of 300 mJ/cm$^2$).

The cured stamper-receiving layers were then peeled off from the nickel disks, and the number of deposits (grain size: 0.27 μm or greater) on the planished surfaces of the nickel disks was measured using a laser surface inspection apparatus (instrument name: LS5000; manufactured by Hitachi Electronics Engineering Co., Ltd).

As a result, 39 deposits were counted on the nickel disk compression-bonded to the stamper-receiving layer of the optical disk producing sheet manufactured in Example 3, 31 deposits were counted on the nickel disk compression-bonded to the stamper-receiving layer of the optical disk producing sheet manufactured in Example 4, and about 4000 deposits were counted on the nickel disk compression-bonded to the stamper-receiving layer of the optical disk producing sheet manufactured in Comparison 2.

Manufacturing Example 1

The optical disk producing sheet manufactured in Example 1 was cut in advance by punching in the same shape as the optical disk substrate described below, the light-release sheet was peeled off, the exposed stamper-receiving layer was laminated to an optical disk substrate (thickness: 1.1 mm, outside diameter: 120 mm) composed of polycarbonate resin, and pressed at a pressure of 29 N.

The heavy-release sheet was subsequently peeled off from the stamper-receiving layer, a nickel stamper was placed on the exposed stamper-receiving layer and pressed at a pressure of 29 N, and the concavoconvex pattern of the stamper was transferred to the stamper-receiving layer. The layer was subsequently irradiated with ultraviolet rays from the side facing the optical disk substrate (instrument name: Adwill RAD-2000m/8; manufactured by Lintec Corporation was used; irradiation conditions: luminance of 310 mW/cm$^2$, light quantity of 300 mJ/cm$^2$), the stamper-receiving layer was cured, and the concavoconvex pattern was fixed.

The stamper was detached from the stamper-receiving layer, and a reflective layer consisting of aluminum and having a thickness of 60 nm was formed by sputtering on the surface of the stamper-receiving layer. An adhesive sheet (thickness: 20 μm) composed of an acrylic adhesive layer alone was laminated to the reflective layer, and a protective sheet (name of product: PureAce C110-80; manufactured by Teijin Limited; thickness: 80 μm) composed of polycarbonate resin was laminated and bonded under pressure to obtain an optical disk.

Manufacturing Example 2

An optical disk was manufactured using the same method and materials as in Manufacturing Example 1 by employing the optical disk producing sheet manufactured in Example 2.

Manufacturing Example 3

The optical disk producing sheet manufactured in Example 3 was cut in advance by punching in the same shape as the optical disk substrate described below, the light-release sheet was peeled off, a nickel stamper (diameter: 120 mm) was placed on the exposed stamper-receiving layer and pressed at a pressure of 29 N, and the concavoconvex pattern of the stamper was transferred to the stamper-receiving layer. The stamper-receiving layer was subsequently irradiated with ultraviolet rays from the side facing the protective layer (instrument name: Adwill RAD-2000m/8; manufactured by Lintec Corporation was used; irradiation conditions: luminance of 310 mW/cm$^2$, light quantity of 300 mJ/cm$^2$), the stamper-receiving layer was cured, and the concavoconvex pattern was fixed.

The stamper was detached from the stamper-receiving layer, and a reflective layer consisting of aluminum and having a thickness of 60 nm was formed by sputtering on the surface of the stamper-receiving layer. An adhesive sheet (thickness: 20 µm) composed of an acrylic adhesive layer alone was laminated to the reflective layer, and an optical disk substrate (thickness: 1.1 mm; outside diameter: 120 mm) composed of polycarbonate resin was laminated and bonded under pressure to obtain an optical disk.

Manufacturing Example 4

An optical disk was manufactured using the same method and materials as in Manufacturing Example 3 by employing the optical disk producing sheet manufactured in Example 4.

In Manufacturing Examples 1–4, no deposits were observed under an optical microscope on stamper surfaces after the optical disk producing sheets had been peeled off.

INDUSTRIAL APPLICABILITY

The number of deposits on a stamper can thus be reduced with the optical disk producing sheet of the present invention.

What is claimed is:

1. An optical disk producing sheet, comprising a stamper-receiving layer that contains an energy rays-curable polymeric material as a principal component thereof, and possesses a pre-curing storage elastic modulus of $10^3$ to $10^6$ Pa.

2. The optical disk producing sheet according to claim 1, wherein the post-curing storage elastic modulus of said stamper-receiving layer is $10^7$ Pa or greater.

3. The optical disk producing sheet according to claim 1, wherein said polymeric material is an acrylic ester copolymer having energy rays-curable groups in the side chains thereof.

4. The optical disk producing sheet according to claim 3, wherein said energy rays-curable groups are unsaturated groups and that the weight-average molecular weight of the acrylic ester copolymer is 100,000 or greater.

5. The optical disk producing sheet according to claim 1, wherein said stamper-receiving layer further contains a photopolymerization initiator.

6. The optical disk producing sheet according to claim 1, wherein a release sheet is laminated to one or both surfaces of said stamper-receiving layer.

7. The optical disk producing sheet according to claim 1, wherein a sheet constituting a protective layer is laminated to one surface of said stamper-receiving layer.

* * * * *